United States Patent
Davidi et al.

(10) Patent No.: US 10,339,233 B2
(45) Date of Patent: Jul. 2, 2019

(54) CALCULATING THICKNESSES OF APPLIED COATING MATERIAL

(71) Applicants: Dror Davidi, Hod Hasharon (IL); Moshe Hazan, Elad (IL); Rahav Madvil, Rishon Lezion (IL)

(72) Inventors: Dror Davidi, Hod Hasharon (IL); Moshe Hazan, Elad (IL); Rahav Madvil, Rishon Lezion (IL)

(73) Assignee: Siemens Industry Software Ltd., Airport City (IL)

( * ) Notice: Subject to any disclaimer, the term of this patent is extended or adjusted under 35 U.S.C. 154(b) by 451 days.

(21) Appl. No.: 14/809,343

(22) Filed: Jul. 27, 2015

(65) Prior Publication Data

US 2017/0032060 A1 Feb. 2, 2017

(51) Int. Cl.
*G06F 17/50* (2006.01)
*B05B 12/12* (2006.01)
*B05D 1/02* (2006.01)
*B05B 13/04* (2006.01)

(52) U.S. Cl.
CPC ........ *G06F 17/5009* (2013.01); *B05B 12/124* (2013.01); *B05D 1/02* (2013.01); *B05B 13/0431* (2013.01); *G06F 2217/16* (2013.01)

(58) Field of Classification Search
CPC ............. G06F 17/5009; G06F 2217/16; B05B 12/124; B05B 13/0431; B05D 1/02
See application file for complete search history.

(56) References Cited

U.S. PATENT DOCUMENTS

| 5,521,477 A * | 5/1996 | Sasaki | B05B 12/00 318/567 |
| 5,687,304 A * | 11/1997 | Kiss | G06T 15/04 345/419 |
| 2004/0213915 A1* | 10/2004 | Andersen | G05B 19/40931 427/421.1 |

(Continued)

OTHER PUBLICATIONS

Nazir et al, Optimisation of interface roughness and coating thickness to maximise coating-subtrate adhesion—a failure prediction and reliability assessmenet modeling, Journal of adhesion science and technology, Apr. 13, 2015, vol. 29, No. 14, 1415-1445.*

(Continued)

*Primary Examiner* — Jay Hann
*Assistant Examiner* — Chuen-Meei Gan
(74) *Attorney, Agent, or Firm* — Lempia Summerfield Katz LLC (57) ABSTRACT

Systems and a method for calculating thickness values of a coating material applied by a coating gun on object surfaces in industrial processes include measuring, on real test surfaces, the thickness values of coating material samples applied by the coating gun on the real test surfaces. The measured thickness values are used to generate 3D virtual objects modeling the coating dispersions of the coating gun at given angles formed between the coating gun and the test surface. The thickness values of the coating material applied on the surface of a simulated object by a simulated gun at a certain angle are calculated by detecting the collision between the 3D virtual object mounted on the simulated coating gun and surface elements of the simulated object surface.

15 Claims, 6 Drawing Sheets

(56) References Cited

U.S. PATENT DOCUMENTS

| | | | | |
|---|---|---|---|---|
| 2006/0171771 | A1* | 8/2006 | Kruse | G06F 3/0346 401/218 |
| 2007/0209586 | A1* | 9/2007 | Ebensberger | G09B 9/00 118/682 |
| 2012/0156362 | A1* | 6/2012 | Sadovoy | B05B 12/084 427/9 |
| 2013/0129907 | A1* | 5/2013 | Popa | B05D 1/02 427/2.1 |
| 2015/0234952 | A1* | 8/2015 | Kruse | G06F 17/5009 703/7 |

OTHER PUBLICATIONS

Wiederkehr et al, Acquisition and optimization of three-dimensional spray foorprint profiles for coating simulations, JTTEE5 22:1044-1052 Aug. 2013.*

Goedjen et al, A simulation technique for predicting thickness of thermal sprayed coatings, NASA Resaerch Associate at Lewis Research Center, 1995, p. 1-15.*

Kout et al, Parameter optimization for spray coating, Advances in Engineering Software, 40(2009)1078-1086.*

Dmitry A. Stepanenko, Modeling of spraying with time-dependent material feed rate, Applied Methematical Modeling 31 (2007) 2564-2576. Nov. 2006.*

Nazir et al, Optimisation of interface roughness and coating thickness to maximise coating-subtrate adhesion—a failure prediction and reliability assessmenet modeling, Journal of adhesion science and technology, Apr. 13, 2015, vol. 29, No. 14, 1415-1445. (Year: 2015).*

Wiederkehr et al, Acquisition and optimization of three-dimensional spray foorprint profiles for coating simulations, JTTEE5 22:1044-1052 Aug. 2013. (Year: 2013).*

Goedjen et al, A simulation technique for predicting thickness of thermal sprayed coatings, NASA Resaerch Associate at Lewis Research Center, 1995, p. 1-15 (Year: 1995).*

Kout et al, Parameter optimization for spray coating, Advances in Engineering Software, 40(2009)1078-1086. (Year: 2009).*

Dmitry A. Stepanenko, Modeling of spraying with time-dependent material feed rate, Applied Methematical Modeling 31 (2007) 2564-2576. Nov. 2006. (Year: 2007).*

Vom Fachbereich Maschinenbau, Modeling and offline simulation of thermal spray coating process for gas turbine applications, der Technischen Universität Darmstadt, p. 1-109 (Year: 2014).*

David C. Conner et al, Paint Deposition Modeling for Trajectory Planning on Automotive Surfaces, IEEE Transactions on Automation Science and Engineering , vol. 2, No. 4, Oct. 2005 (Year: 2005).*

Meng, Fanqi, "Trajectory and spray control planning on unknown 3D surfaces for industrial spray painting robot" (2008). Graduate Theses and Dissertations. 11188. (Year: 2008).*

Thomas Wiederkehr and Heinrich Müller, Acquisition and Optimization of Three-Dimensional Spray Footprint Profiles for Coating Simulations, 1044-1052 vol. 22(6) Aug. 2013 Journal of Thermal Spray Technology (Year: 2013).*

Qiaoyan Ye, Andreas Scheibe , Unsteady numerical simulation of electrostatic spray-painting processes with moving atomizer Presented at the 13th International Coating Science and Technology Symposium, Sep. 10-13, 2006, Denver, Colorado1 (Year: 2006).*

* cited by examiner

CALCULATING THICKNESSES OF APPLIED COATING MATERIAL

TECHNICAL FIELD

The present disclosure is directed to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems).

BACKGROUND

The process of applying coating materials on surfaces of objects is a common operation in a large variety of industrial processes.

As used in the art, the term "coating" may denote either the verb, e.g., the operation of applying coating material, such as by spraying, or the noun, e.g., the coating material itself. In the industrial domain, a "coating material", or simply a "coating", is a layer of a substance spread over an object surface for protection, functional and/or decoration purposes.

Coating materials applied to base materials may be used to provide properties not inherent in the base, including corrosion, wear-resistance, conductivity, color, solderability, and others.

Examples of coating materials are paints, lacquers, metal platings, thermal-barrier coating materials, anti-corrosion coating materials, and other types of protective, functional or decorative coating materials.

The amount of coating applied on a product object surface, that is, the coating thickness, is important to the product final use and cost.

In fact, for quality, security, marketing, and cost efficiency purposes, a coating operation is required to meet certain levels in terms of the achieved thicknesses and uniformity levels of the coating layer.

Those skilled in the art know that there are several types of coating application techniques and coating guns, the usage choice depending on a large variety of factors (e.g., the type of coating material used, the type of object surfaces, industrial requirements, physical properties, chemical properties, and many other factors).

Due to the fact that, in several industrial processes, coating operations may be performed by coating guns mounted on robots, simulations of automated coating processes are used in order to achieve the desired levels of production optimizations.

In fact, as some coating materials may be highly expensive and as production time may often be a critical factor, an efficient technique for simulating the coating process on three-dimensional (3D) virtual environment may reduce design and material costs, shorten process time, and provide to satisfy the desired quality standards, engineering goals, and security levels.

The models required for exact calculation of the applied coating thicknesses on object surfaces in industrial automated processes are very complex, since they depend on the multiple physical, chemical, geometrical, and kinematic factors of all the elements involved in the coating procedure.

In the art, there are known solutions that attempt to predict for each applied coating droplet the expected contribution to the total spread coating thickness based on the droplets physical properties.

Unfortunately, such coating thickness calculation techniques are complicated and very time consuming, since they require complex calculations to be performed on a huge number of coating droplets.

In the field of industrial automation, the fact that the coating thickness calculation techniques are too slow is particularly problematic, since as a consequence to it, also the corresponding industrial process optimization is slowed. In fact, some of these coating thickness estimation techniques have a calculation time of several hours or of a few days with common computation power.

In order to overcome the problems in terms of slow performances and calculation complications of such known solutions, improved techniques are desirable.

SUMMARY

The scope of the present invention is defined solely by the appended claims and is not affected to any degree by the statements within this summary. The present embodiments may obviate one or more of the drawbacks or limitations in the related art.

Various disclosed embodiments include CAD and simulation methods and corresponding systems and computer-readable mediums. A method includes measuring on real test surfaces; the thickness values of coating material samples applied by the coating gun on the real test surfaces. The method includes using the measured thickness values to generate 3D virtual objects modeling the coating dispersions of the coating gun at given angles formed between the coating gun and the test surface. The method includes calculating the thickness values of the coating material applied on the surface of a simulated object by a simulated gun at a certain angle, by detecting the collision between the 3D virtual object mounted on the simulated coating gun and surface elements of the simulated object surface.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, refer to inclusion without limitation; the term "or" is inclusive, denoting and/or; the phrases "associated with" and "associated therewith," as well as derivatives thereof, may refer to include, be included within, interconnect with, contain, be contained within, connect to or with, couple to or with, be communicable with, cooperate with, interleave, juxtapose, be proximate to, be bound to or with, have, have a property of, or the like; and the term "controller" refers to any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Significant efforts are invested in finding efficient techniques for calculating coating thicknesses applied by industrial coating gun robots, due to their several benefits.

A benefit is providing the reaching of the desired levels of functionality and production standard, e.g., by verifying that the applied layer of coating material is thick enough to achieve its engineering goals.

Another benefit is providing the reaching of the desired levels quality and customer standards, e.g., by verifying, for example in case of paint, that the applied paint layer is homogenous for visualization purposes, for example, by providing that the applied paint layer is not too thick to avoid paint leaks.

Another benefit is providing the reaching of the desired levels of environmental requirements, e.g., by verifying the amount of coating material applied in order to reduce unnecessary emissions to the atmosphere and/or accumulated coating rests on the floor during production.

Another benefit is providing the reaching of the desired levels of production resource allocation, since often the coating shop is a bottleneck in industrial production so that a simulation of the entire process chain enables to minimize shop-floor resource utilizations.

Another benefit is providing the reaching of the desired levels of production costs, e.g., by enabling optimizations aimed at cost savings in terms of applied material and by reducing the amount of production quality checks required to verify coating material distribution.

Embodiments enable fast calculations of simulated coating thicknesses so that process simulations and optimizations may be performed without waiting times and delays, as, instead and unfortunately, it is the case with previous coating thickness calculation techniques requiring complex and long computations.

Embodiments enable adjusting capabilities of the coating process, even at run-time during simulation, with an acceptable degree of thickness calculation accuracy.

According to the desired accuracy level of coating thickness calculation, embodiments may be used as an act of a thickness validation process after which it is possible to make a thickness calculation double-check with the known complex calculation techniques, (e.g., like the ones based on physical coating droplet models), so that, advantageously, the usage of such complex and slow techniques is significantly reduced.

Figure 1:
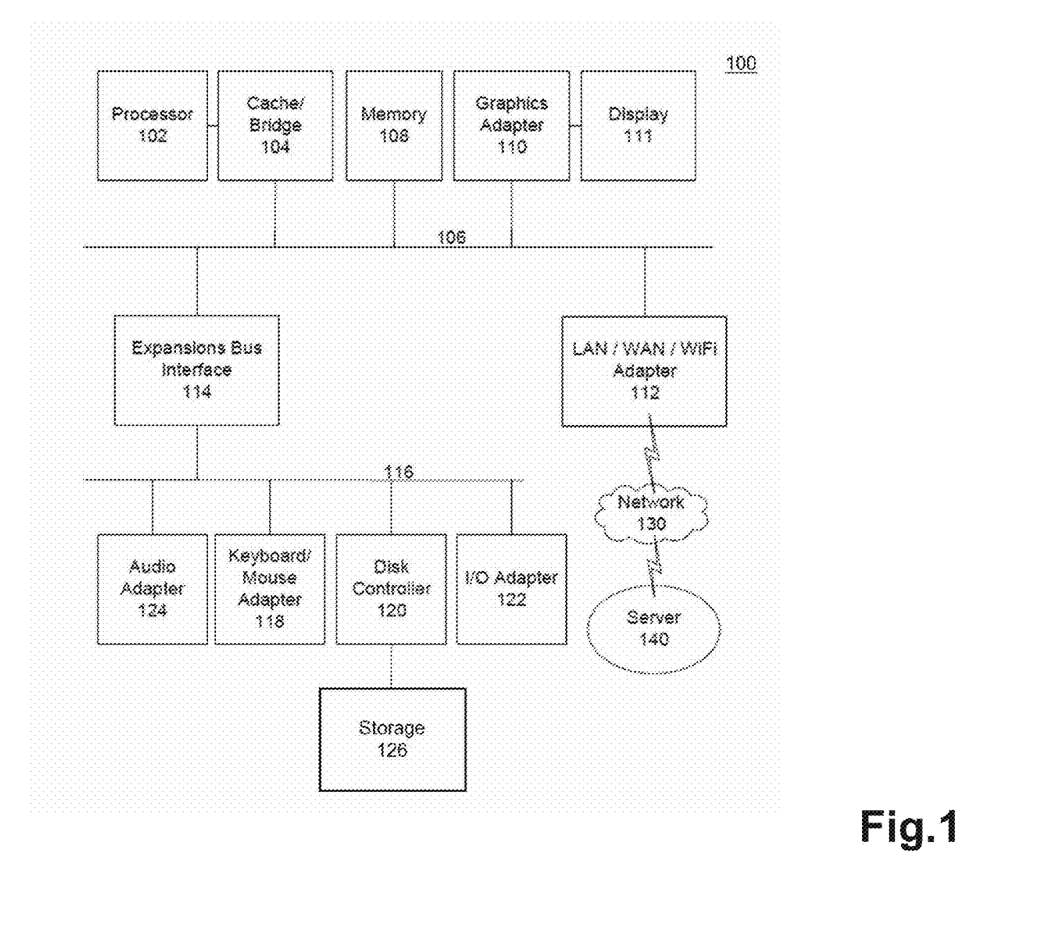
FIG. 1 illustrates a block diagram of an example of a data processing system in which an embodiment may be implemented.

FIG. 1 illustrates a block diagram of a data processing system in which an embodiment may be implemented, for example as a PDM system particularly configured by software or otherwise to perform the processes as described herein, and in particular as each one of a plurality of interconnected and communicating systems as described herein. The data processing system illustrated may include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network (WAN)/Wireless (e.g., Wi-Fi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 may be connected to a storage 126, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example depicted is audio adapter 124, to which speakers may be connected for playing sounds. Keyboard/mouse adapter 118 provides a connection for a pointing device, such as a mouse, trackball, track pointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure may include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 may be connected to a network 130 (not a part of data processing system 100), which may be any public or private data processing system network or combination of networks, as known to those of skill in the art, including the Internet. Data processing system 100 may communicate over network 130 with server system 140, which is also not part of data processing system 100, but may be implemented, for example, as a separate data processing system 100.

Figure 2:
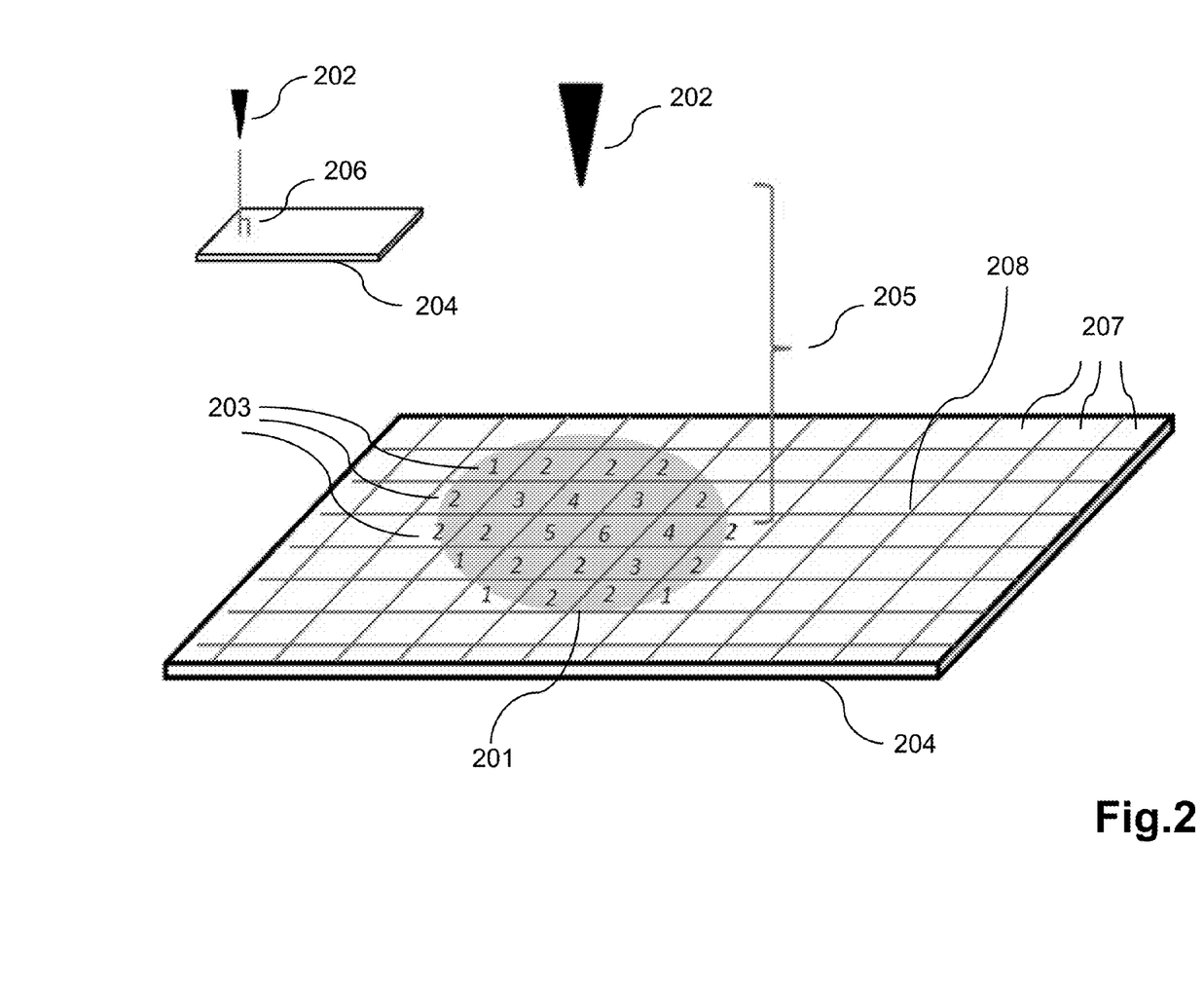
FIG. 2 illustrates a schematic view of a coating material sample on a test surface with measured thicknesses in accordance with a disclosed embodiment.

FIG. 2 illustrates a schematic view of a real coating sample on a real test surface with measured coating thicknesses in accordance with a disclosed embodiment. With the term coating sample or coating material sample 201 it is be intended the layer of coating material applied by the coating gun in a given application interval, such sample layer has a certain thickness profile that may be measured.

In the example embodiment of FIG. 2, the real coating sample 201 is depicted to have a circular base. Those skilled in the art will understand that other shapes of the sample base are possible, depending on a variety of factors, e.g., such as the shape of the coating gun nozzle, of the surface material type and shape, on the type of applied coating material, and other factors. As used herein, the term "coating gun" may be used interchangeably to refer to the "coating gun nozzle."

The coating sample 201 is generated by spraying coating material with a real coating gun nozzle 202 on a real test surface 204 for a given application time interval, at a given coating flow rate, at a given distance 205 between the gun nozzle 202 and the test surface 204 and at a given angle 206 formed between the gun nozzle axis and the test surface 204.

The generation of a set of real coating samples 201 of the real coating gun distribution taken on real test surfaces 204 is an act for calculating the simulated coating thicknesses on simulated object surfaces.

The set of coating samples 201 may conveniently be generated by varying the mutual positioning between the gun nozzle 202 and the test surface 204, for example by varying the following parameters: (1) the distance 205 between the painting gun nozzle tip and the test surface 204, inside the effective distance range; (2) the angle 206 formed between the gun nozzle axis and the test surface 204.

Figure 3:
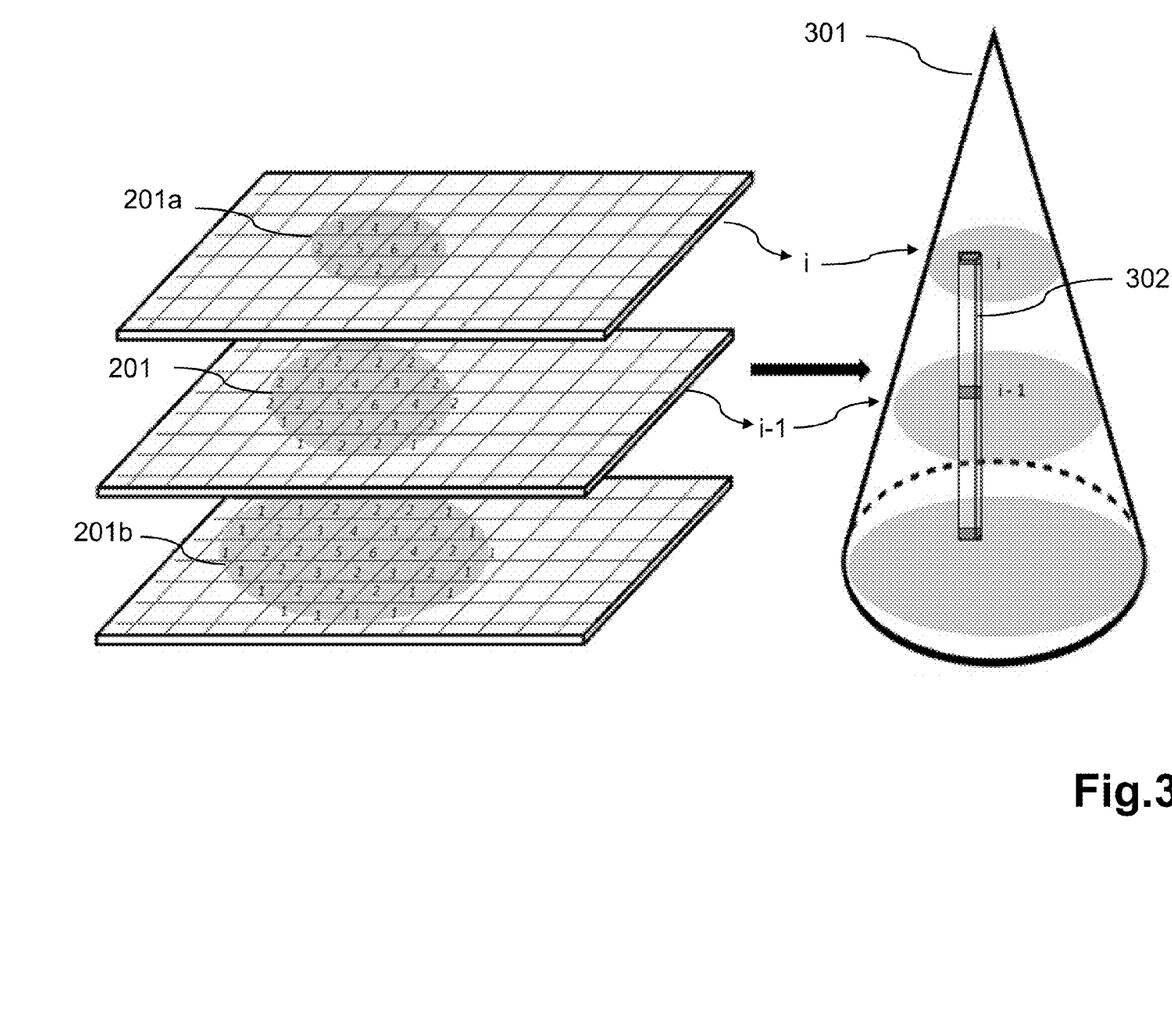
FIG. 3 illustrates a schematic view of a generated virtual 3D object modeling the coating dispersion by using the measured coating sample thicknesses in accordance with a disclosed embodiment.

An example embodiment of workflow acts for coating sample generation and thickness measure collection includes the following: (1) the coating gun 202 is placed, at a selected distance and at a selected angle, relative to the test surface 204; (2) for a given application time interval, coating material is sprayed on the test surface, creating a coating sample 201 specific for the selected distance and angle; (3) sample thickness values 203 are measured and inserted in a two-dimensional (2D) matrix; (4) for the same selected angle value, a set of samples 201, 201*a*, 201*b* (as depicted in FIG. 3) is generated at a set of different distances, so that the taken set of sample thickness measurements is stored into a set of 2D matrixes; (5) the above acts 1-4 are repeated for different angle values; (6) the result is a collection of 2D matrixes representing the thickness values of different samples of coating material being applied on test surfaces at different mutual distances and angles relatively to the coating gun.

Those skilled in the art will appreciate that there are several ways for generating a 2D matrix out of the measured coating thicknesses. After the coating material has been sprayed on the sample test surface 204, the coating sample 201 may have a given coating thickness distribution. In one embodiment, the sample test surface may be divided into several cells 207 through a grid 208 so that a 2D matrix is generated with the measured cell thickness values 203 of each cell 207 of the grid 208. The numbers 1 to 6 in the grid cells 207 are the measured thickness values, and an empty grid cell 207 denotes a thickness value equal to zero.

FIG. 3 illustrates a schematic view of a generated virtual 3D object 301 modeling the coating dispersion by using the measured coating sample thicknesses 203 in accordance with a disclosed embodiment.

With the example of the disclosed embodiment of FIG. 3, it is depicted schematically one of the ways for creating the virtual 3D volume object 301 representing the coating dispersion at a given angle by using the measured coating sample thicknesses 203. In the example depicted in FIG. 3, the value of the angle 206 between the gun nozzle axis and the test surface is 90 degrees.

For the selected angle value, the obtained 2D matrixes are ordered according their distance values. The ordered 2D matrixes are then imported into a 3D virtual environment, e.g., by placing them on top of each other, where the matrix with the smallest distance value is the top matrix.

For each cell in matrix i, and its corresponding cell in matrix i−1, a 3D volume entity 302 is created, representing the thickness value function between the cell in matrix i and its corresponding cell in matrix i−1. In case both cells have zero thickness values, no volume entity needs to be created. By repeating such acts for all the cells of all the 2D matrixes for the chosen angle, the 3D virtual volume object 301 modeling the coating dispersion for the chosen angle is generated.

Those skilled in the art will understand that the above outlined acts may be repeated for various other selected angle values different than 90 degrees, for different distances, and for a variable number of generated samples, according to the desired goal of granularity and precision levels.

In other embodiments, other parameters may be varied for generating the set of coating samples others than distances and angles. Those skilled in the art will understand that it is possible to generate different coating samples by varying the application time interval or exposure time interval (e.g., of the spraying gun), the coating flow rate (e.g., of the spraying gun), the type of material of the test surfaces, coating material type, and/or other parameters. All the generated coating samples 201 may be collected and grouped together according to the relevant used parameters. The loaded data from the coating sample measurements together with the information of the used parameters are then used for generating the 3D virtual objects 301 modeling the coating dispersion for simulation purposes, with the desired parameters, by using normalization and/or interpolation techniques. For example, those skilled in the art will understand that, advantageously, 3D virtual objects may be generated for simulation purposes to have different desired exposure and application time intervals, flow rates, angles, and/or distances than the ones actually used in the real measurements thanks to the possibilities provided by normalization and interpolation techniques.

Hence, several coating samples are used for the creation of multiple 3D compound virtual objects representing the coating dispersion of the coating gun at desired parameters. In embodiments, the 3D virtual object may be seen as composed of several volume entities, each representing the thickness of coating material being applied at the volume entity.

Figure 4:
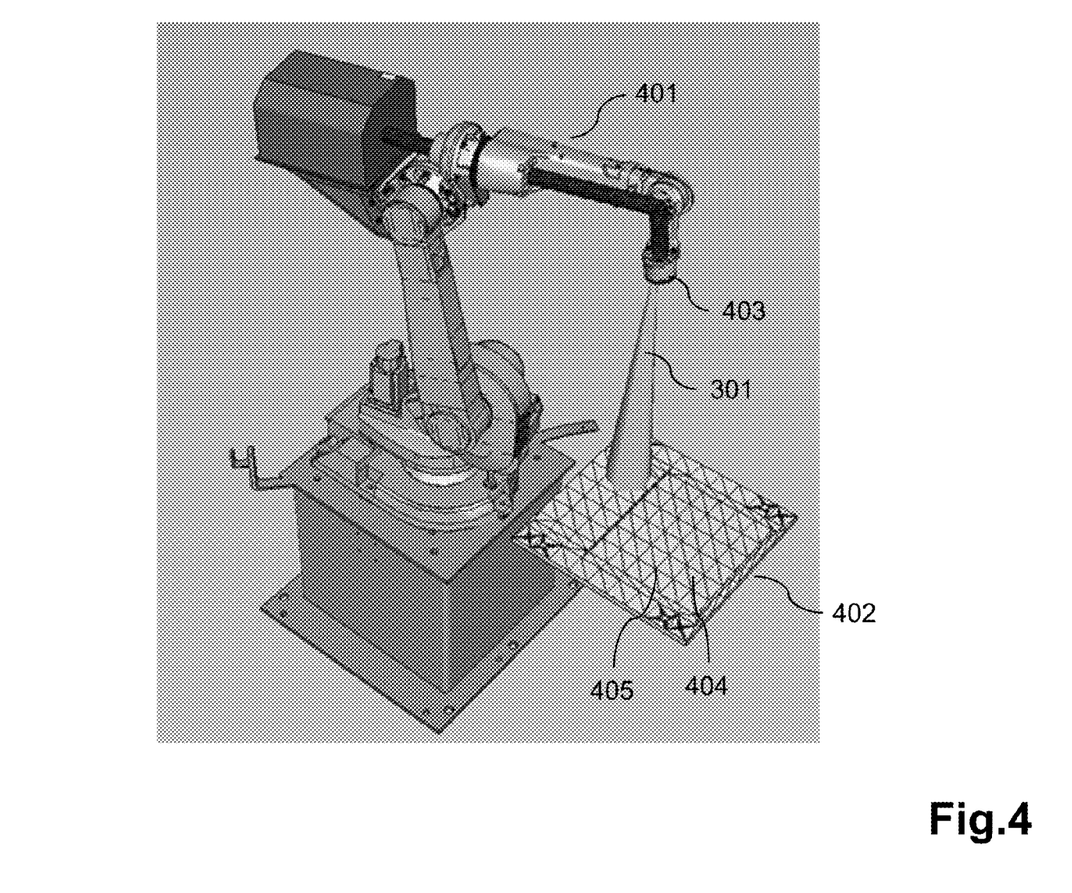
FIG. 4 illustrates a schematic view of a simulated coating gun with a virtual 3D object mounted on its nozzle, simulating the coating process on a simulated object surface in accordance with a disclosed embodiment.

FIG. 4 illustrates a schematic view of a simulated coating gun robot 401 with a virtual 3D object 301 mounted on its coating gun nozzle 403, simulating the coating process on a simulated object surface 402 in accordance with a disclosed embodiment.

In embodiments, four main phases may be outlined: (I.) Initialization of the 3D simulation scene, (II.) Creation of the mesh, (III.) Definition of the collision set, and (IV.) Simulation of the coating application.

I. Initialization of the 3D Simulation Scene

The elements that take part in the specific robotic coating process are imported into 3D virtual environment simulation software. Suitable 3D virtual environment simulation software may include, but is not limited to, Process Simulate, RobotExpert, and NX CAM, products of Siemens PLM Software. The main elements may include the coating robot 401, coating gun nozzle 403, coating path/operation details, and the parts or object surfaces 402 over which coating material is to be applied. The elements are positioned according to the desired specific shop-floor design locations, to simulate the real life coating scene. The 3D virtual object 301, representing the paint dispersion for the chosen operation angle, is then mounted on the coating gun nozzle 403.

II. Creation of the Mesh

Since coating material is applied on the faces of the object parts, the relevant object surfaces for coating are selected, and a mesh 404 representation is generated for each object surface. A polygon mesh includes a collection of vertices, edges, and faces (e.g., triangles) defining the shape of a polyhedral object in 3D computer graphics. The resulting mesh geometry is similar to the geometry of the surface of the original object, and the mesh geometry includes several vertexes, called herein mesh points. As a result, each mesh point of the mesh is a representation of a point on the part surface. Those skilled in the art will understand that the density of the mesh surface elements depends on the desired level of accuracy and the surface shape. The mesh density may also depend on the used spraying techniques. For example, laser paint spraying may require higher mesh element density than, for example, traditional non-laser paint gun spraying techniques.

III. Definition of the Collision Set

In the 3D virtual environment, a collision set is defined between the following two groups of elements: mesh elements and the entities of the 3D virtual object 301 representing the paint dispersion. Mesh elements may be points, edges, and/or faces. In this exemplary embodiment, the mesh elements are chosen to be mesh points 405.

IV. Simulation of the Coating Application

Using 3D virtual environment software, the coating path and operation are simulated. During simulation, the robot 401 and its attached coating gun 403 follows the specific coating path and operation. For each specific operation angle, the specific 3D virtual object 301 is mounted on the coating gun 403 and it moves and collides with mesh points 405. For each time interval, a dynamic collision detection engine reports which collision pairs are detected (e.g., mesh point 405 and collided entity of virtual 3D object 301). For each collision pair, it is calculated the thickness value, for example as provided by the function of the 3D virtual object entity that is involved in the collision. Each time interval represents the sampling time interval where collision is evaluated, for example, such a time interval may be in the order of a few milliseconds. The coating simulation is a process having a certain duration, (e.g., in the order of seconds and several minutes or more), and it is discretized in time intervals in order to evaluate collision.

Those skilled in the art will understand that there is a relationship between the length of the time interval and the exposure time interval of the specific mounted 3D virtual object. Those skilled in the art will understand that the time interval may be varied; a smaller time interval selected will achieve more precise results but require a longer calculation time.

In embodiments, the thickness calculation may be performed at runtime, during simulation. In other embodiments, the thickness calculation may be performed, offline, (e.g., at the end of the simulation), by using the collision pair list generated during simulation.

In embodiments, the thickness calculation may conveniently be based on interpolating the thickness value using the top and bottom values from the matrixes of the samples used for the entity volume creation. The obtained calculated thickness value is then added to the collided mesh point thickness value. At the end of the simulation, each mesh point 405 has a certain calculated thickness value.

In embodiments, the collided mesh points in a discretization interval are approximated in a flat surface with respect to the central collision point so that the same virtual 3D object with the specific operation angle may be conveniently used, with an acceptable approximation degree. In other embodiments, in boundary situations where mesh points located between surfaces having different angles are identified and, if the level of approximation versus real world coating is not acceptable, a 3D virtual object with another angle may be used for thickness calculation. In other embodiments, for such mesh point in boundary situations, one may rely on the traditional complex thickness calculation techniques already used in the art, e.g., like the ones based on physical coating droplet models.

In embodiments, the calculated coating thickness values may be advantageously used to evaluate coating coverage on the simulated object surface and/or coating uniformity level on the simulated object surface.

Figure 5:
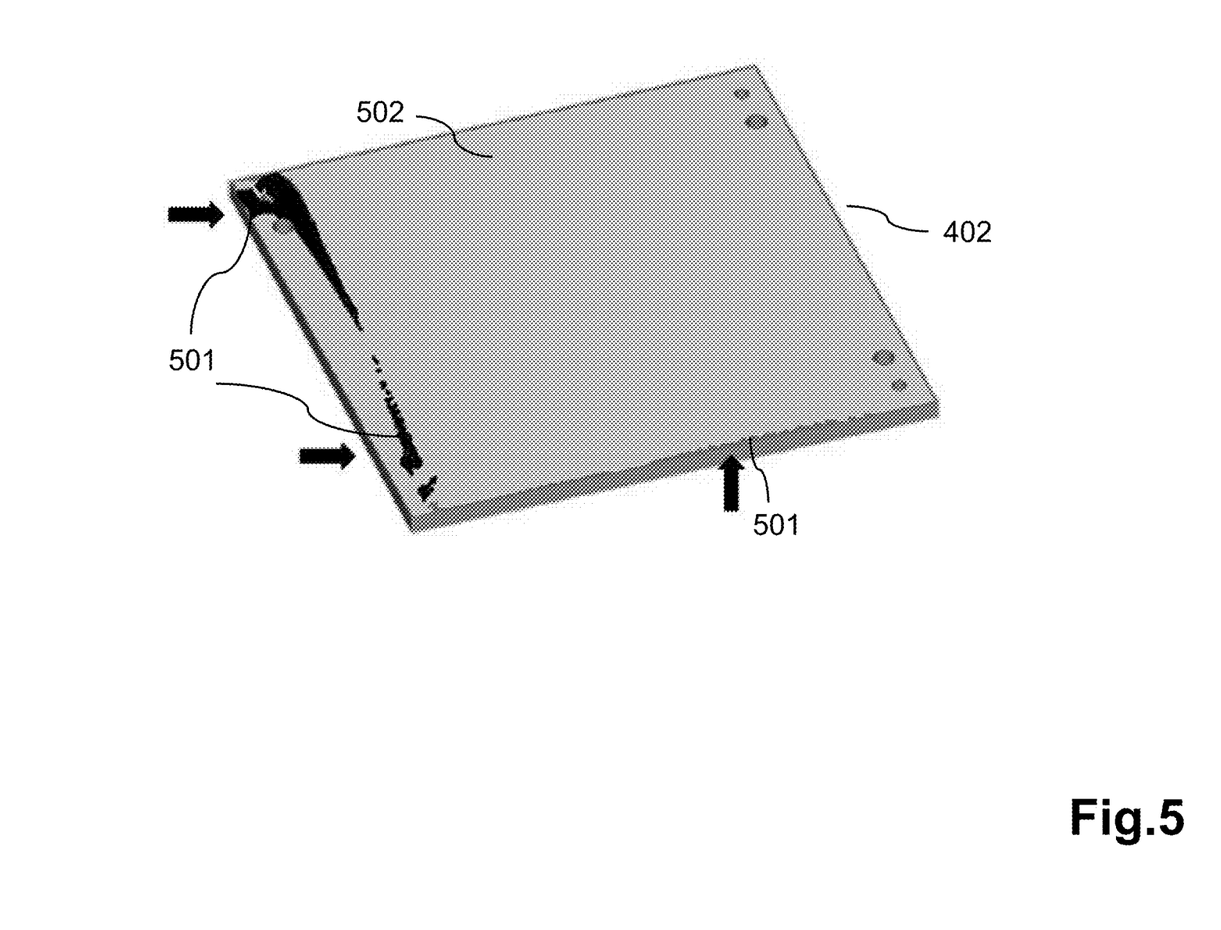
FIG. 5 illustrates a schematic view of the results of calculated coating thicknesses on a simulated object surface in accordance with a disclosed embodiment.

FIG. 5 illustrates a schematic view of the results of calculated coating thicknesses on a simulated object surface in accordance with a disclosed embodiment. The calculated coating thickness values of the mesh elements of the simulated object surface may be represented, in embodiments, by thickness color maps, numerical representations, or by any other desired representation technique. The example embodiment in FIG. 5 depicts a grey-scale color representation. The points colored 501 with darker grey levels are the points where thickness values differ from the other points 502 having a lighter gray color. In such locations some thickness non-uniformities are detected. The issue of detection of different coating material thicknesses may be quite critical in some specific industrial processes. In fact, an applied coating layer that is not uniform may be problematic in extreme conditions, (e.g., during exposure to chemical substances, corrosion, or in scenarios of high speeds), where for example, extreme pressure and/or extreme heat (e.g., aerospatial, turbines, and many others) is reached, since the locations with reduced and/or increased thicknesses may become critical areas for potential growth of fractures. The check of uniformity of coating thickness levels is thus important also in order to reduce potential fracture risks due to non-uniform applications of protective coating layers.

Figure 6:
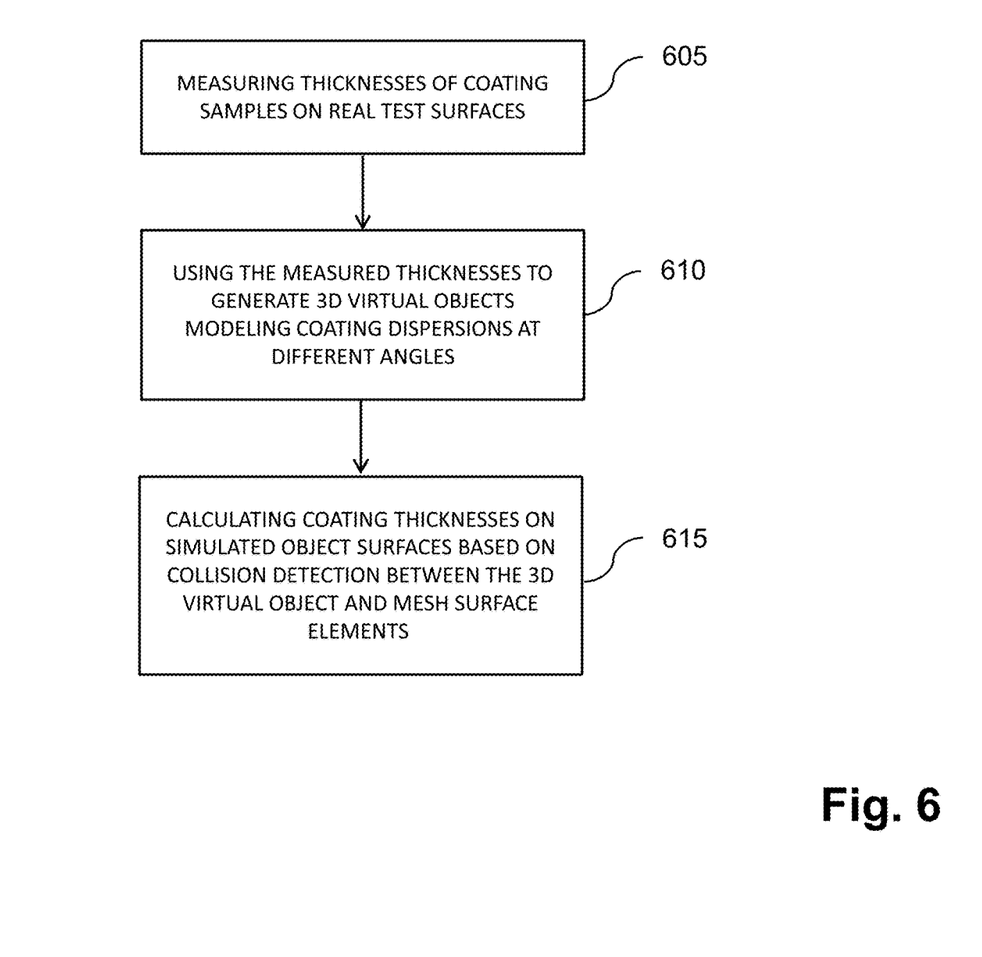
FIG. 6 illustrates a flowchart of a process for calculating coating thicknesses in accordance with disclosed embodiments.

FIG. 6 illustrates a flowchart of a process for calculating coating thicknesses in accordance with disclosed embodiments. The coating thickness calculation is performed, in a simulation environment, by a data processing system, e.g., such as the data processing system 100 of FIG. 1. An example of a simulation environment may be based on realistic robot simulation (RRS) described in realistic-robot-simulation.org, which is incorporated by reference herein. Those skilled in the art will understand that, in other embodiments, any other robot simulation engine may conveniently be used.

At act 605, thickness values 203 of coating material samples 201 applied by a coating gun 202 are measured on real test surfaces 204. Such coating samples or coating footprint profiles have certain thicknesses that may be measured. In the art, there are several techniques for measuring thicknesses of coating material profiles sprayed on a surface. Examples of known thickness measuring techniques, (e.g., in the field of metal plating), include x-ray fluorescence, eddy-current, magnetic induction, and beta backscatter, all of which are incorporated by reference herein. Coating material samples may be taken at different angles 206 between the test surfaces 202 and the coating gun 202 and, for the same angle, at different distances 205 between the test surfaces 204 and the coating gun 202. In other embodiments, other additional test parameters may be varied for generation of real coating footprint samples 201.

At act 610, the system uses the measured thickness values to generate 3D virtual objects modeling the coating dispersions of the coating gun at given angles formed between the coating gun and the test surface. The taken real coating samples are thus converted into a 3D virtual object 301. For example, the system is able to generate, for a given angle, a 3D virtual object by collecting all the measured coating thickness values of the coating samples at different distances for the same given angle, (e.g., in form of 2D matrixes), and placing them together to generate the volume of the 3D virtual object modeling the coating dispersion, where the thickness values of distances not measured may be conveniently obtained via interpolating functions.

At act 615, the system calculates the simulated thickness values of the coating material applied on the surface of the simulated object on which a coating layer is to be applied by a simulated gun at a certain angle, by detecting the collision between the 3D virtual object mounted on the simulated coating gun and surface elements of the simulated object surface. Hence, the 3D virtual object is used as a source for 3D environment dynamic collision detection, via a simulation of the coating process of a moving coating gun in a 3D virtual environment. In embodiments, a robot simulation is executed whereby the created 3D virtual object is mounted on the nozzle of the simulated coating gun. A mesh is being created for the objects surfaces that are about to be sprayed with coating material. As the coating application simulation runs, dynamic collision detection is applied between the entities of the 3D virtual object and the mesh elements. Each collision contributes to the mesh element thickness value, whereas the exact amount of applied coating material is determined based on the value of the collided entity of the 3D virtual object.

One or more of the processor 102, the memory 108, and the simulation program 152 running on the processor 102 receive the inputs via one or more of the local system bus 106, the adapter 112, the network 130, the server 140, the interface 114, the I/O bus 116, the disk controller 120, the storage 126, and so on. Receiving, as used herein, may include retrieving from storage 126, receiving from another device or process, receiving via an interaction with a user, or otherwise.

Of course, those of skill in the art will recognize that, unless specifically indicated or required by the sequence of operations, certain acts in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, act, or function is an essential element that is included in the claim scope: the scope of patented subject matter is defined only by the allowed claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for calculating thickness values of coating material applied by a coating gun on object surfaces in an industrial process, the method comprising:
    applying, by the coating gun, a plurality of coating material samples on a plurality of real test surfaces at a plurality of angles and at a plurality of distances between the coating gun and the plurality of real test surfaces, wherein at least one real test surface of the plurality of real test surfaces is a three-dimensional (3D) surface;
    measuring thickness values of the coating material samples on the plurality of real test surfaces;
    storing the measured thickness values in a set of 2D matrices having a thickness measurement at each distance of the plurality of distances and at each angle of the plurality of angles;
    ordering, for a selected angle value, the 2D matrices according to distance values;
    importing the ordered 2D matrices into a 3D virtual environment;
    generating, by a data processing system, one or more 3D virtual objects modeling coating dispersions of the coating gun moving along a coating path at the plurality of angles and at the plurality of distances formed between the coating gun and the plurality of real test surfaces, using the measured thickness values of the coating material samples, wherein the generating of the one or more 3D virtual objects uses the imported ordered 2D matrices;
    calculating, by the data processing system, thickness values of the coating material applied on a 3D surface of a simulated object by a simulated gun at a certain angle, by detecting a collision between a 3D virtual object mounted on the simulated coating gun representing a coating dispersion and one or more 3D surface elements of the simulated object surface; and
    displaying the calculated thickness values in a thickness color map or a numerical representation for various locations of the 3D surface of the simulated object, wherein the displayed thickness values enable adjusting capabilities of the industrial process at run-time.

2. The method of claim 1, wherein the coating material is selected from the group consisting of one or more of the following: paints, lacquers, metal platings, thermal-barrier coating materials, and anti-corrosion coating materials.

3. The method of claim 1, wherein the calculated coating thickness values are used to evaluate a coating coverage on the simulated object surface, a coating uniformity level on the simulated object surface, or the coating coverage and the coating uniformity level on the simulated object surface.

4. The method of claim 1, wherein the one or more 3D surface elements are selected from the group consisting of: vertexes, edges, and elementary faces.

5. The method of claim 1, wherein the measuring is performed via x-ray fluorescence, eddy-current, magnetic induction, beta backscatter, or a combination thereof.

6. The method of claim 1, wherein the thickness color map is a grey-scale color map.

7. The method of claim 1, wherein the one or more 3D virtual objects are generated through a normalization or interpolation technique of the measured thickness values of the coating material samples.

8. A data processing system comprising:
    a processor; and
    an accessible memory, the data processing system configured to:
        receive inputs from measuring on a plurality of real test surfaces a plurality of thickness values of coating material samples applied by a coating gun on the plurality of real test surfaces at a plurality of angles and at a plurality of distances between the coating gun and the plurality of real test surfaces, wherein at least one real test surface of the plurality of real test surfaces is a three-dimensional (3D) surface;
        store the measured thickness values in a set of 2D matrices having a thickness measurement at each distance of the plurality of distances and at each angle of the plurality of angles;
        order, for a selected angle value, the 2D matrices according to distance values;
        import the ordered 2D matrices into a 3D virtual environment;
        use the measured plurality of thickness values of the coating material samples to generate one or more 3D virtual objects modeling the coating dispersions of the coating gun moving along a coating path at the plurality of angles and at the plurality of distances formed between the coating gun and the plurality of test surfaces, wherein the generation of the one or more 3D virtual objects uses the imported ordered 2D matrices; and
        calculate thickness values of the coating material applied on a 3D surface of a simulated object by a simulated gun at a certain angle, by detecting a collision between a 3D virtual object mounted on the simulated coating gun representing a coating dispersion and one or more 3D surface elements of the simulated object surface; and
    a display configured to display the calculated thickness values for various locations of the 3D surface of the simulated object in a thickness color map or a numerical representation, wherein the displayed thickness values enable adjusting capabilities of an industrial process at run-time.

9. The data processing system of claim 8, wherein the coating material is selected from the group consisting of one or more of the following: paints, lacquers, metal platings, thermal-barrier coating materials, and anti-corrosion coating materials.

10. The data processing system of claim 8, wherein the calculated coating thickness values are used to evaluate a coating coverage on the simulated object surface, a coating uniformity level on the simulated object surface, or the coating coverage and the coating uniformity level on the simulated object surface.

11. The data processing system of claim 8, wherein the one or more 3D surface elements are selected from the group consisting of: vertexes, edges, and elementary faces.

12. A non-transitory computer-readable medium encoded with executable instructions that, when executed, cause one or more data processing systems to:
    receive inputs from measuring on a plurality of real test surfaces a plurality of thickness values of coating material samples applied by a coating gun on the plurality of real test surfaces at a plurality of angles and at a plurality of distances between the coating gun and the plurality of real test surfaces, wherein at least one real test surface of the plurality of real test surfaces is a three-dimensional (3D) surface;

store the measured thickness values in a set of 2D matrices having a thickness measurement at each distance of the plurality of distances and at each angle of the plurality of angles;

order, for a selected angle value, the 2D matrices according to distance values;

import the ordered 2D matrices into a 3D virtual environment;

use the measured thickness values of the coating material samples to generate one or more 3D virtual objects modeling the coating dispersions of the coating gun moving along a path at the plurality of angles and the plurality of distances formed between the coating gun and the plurality of test surfaces, wherein the generation of the one or more 3D virtual objects uses the imported ordered 2D matrices;

calculate thickness values of the coating material applied on a 3D surface of a simulated object by a simulated gun at a certain angle, by detecting a collision between a 3D virtual object mounted on the simulated coating gun representing a coating dispersion and one or more 3D surface elements of the simulated object surface; and display the calculated thickness values for various locations of the 3D surface of the simulated object in a thickness color map or a numerical representation, wherein the displayed thickness values enable adjusting capabilities of an industrial process at run-time.

13. The non-transitory computer-readable medium of claim 12, wherein the coating material is selected from the group consisting of one or more of the following: paints, lacquers, metal platings, thermal-barrier coating materials, and anti-corrosion coating materials.

14. The non-transitory computer-readable medium of claim 12, wherein the calculated coating thickness values are used to evaluate a coating coverage on the simulated object surface, a coating uniformity level on the simulated object surface, or the coating coverage and the coating uniformity level on the simulated object surface.

15. The non-transitory computer-readable medium of claim 12, wherein one or more 3D surface elements are selected from the group consisting of: vertexes, edges, and elementary faces.

* * * * *